(12) United States Patent
Lin

(10) Patent No.: US 12,457,991 B2
(45) Date of Patent: Nov. 4, 2025

(54) CAT LITTER BASIN CONVENIENT FOR CLEANING

(71) Applicant: Shoubang Lin, Zhejiang (CN)

(72) Inventor: Shoubang Lin, Zhejiang (CN)

( * ) Notice: Subject to any disclaimer, the term of this patent is extended or adjusted under 35 U.S.C. 154(b) by 0 days.

(21) Appl. No.: 18/592,096

(22) Filed: Feb. 29, 2024

(65) Prior Publication Data
US 2025/0275514 A1 Sep. 4, 2025

(51) Int. Cl.
*A01K 1/01* (2006.01)

(52) U.S. Cl.
CPC .................................. *A01K 1/0114* (2013.01)

(58) Field of Classification Search
CPC ............................ A01K 1/0114; A01K 1/0107
See application file for complete search history.

(56) References Cited

U.S. PATENT DOCUMENTS

| | | | | |
|---|---|---|---|---|
| 5,329,878 A * | 7/1994 | McCauley | ........... | A01K 1/0107 119/673 |
| 5,893,336 A * | 4/1999 | Vice | ..................... | A01K 1/0114 119/166 |
| 5,924,383 A * | 7/1999 | Smith | .................. | A01K 1/0157 119/847 |
| 6,371,048 B1 * | 4/2002 | Smith | .................. | A01K 1/0107 119/168 |
| 2009/0250014 A1 * | 10/2009 | Juan | ...................... | A01K 1/0107 119/482 |
| 2014/0069342 A1 * | 3/2014 | Khalili | ................. | A01K 1/0114 119/165 |
| 2015/0020743 A1 * | 1/2015 | Bauer | .................. | A01K 1/0107 119/166 |
| 2019/0373844 A1 * | 12/2019 | Ward | ................... | A01K 1/0107 |
| 2024/0196854 A1 * | 6/2024 | Hrdina | ................. | A01K 1/0107 |
| 2025/0040509 A1 * | 2/2025 | Zhong | ..................... | A01K 1/01 |

* cited by examiner

*Primary Examiner* — Jessica B Wong
(74) *Attorney, Agent, or Firm* — Hawaii Patent Services; Nathaniel K. Fedde; Kenton N. Fedde

(57) ABSTRACT

A cat litter basin convenient for cleaning comprises an outer frame and an inner frame; the outer frame has a length and a width, the outer frame extends upward along the length direction to form a side wall, and the side wall is provided with a slope with gradually decreasing height along the length direction; the inner frame comprises a shovel plate, and the shovel plate extends upward along the length direction to form a pedal, both the shovel plate and the pedal are provided with a plurality of sieve holes, and the pedal is provided with a plurality of protrusions; the inner frame is provided with a litter baffle, which is arranged at the bottom of the pedal and inclines to the bottom of the outer frame, and one side of the litter baffle near the shovel plate is provided with a litter leakage place.

20 Claims, 21 Drawing Sheets

CAT LITTER BASIN CONVENIENT FOR CLEANING

TECHNICAL FIELD

The present invention relates to the technical field of pet products, in particular to a cat litter basin convenient for cleaning.

BACKGROUND

With the improvement of people's living standards, pet cats have entered thousands of households, and the subsequent cat cleaning problem has plagued cat owners; at present, the most common way to clean cat poop is to manually clean cat poop with external cleaning tools with leakage holes. The placement of cleaning tools will occupy space, and the cleaning tools are smaller than the cat litter basin, so it is a waste of time and effort to shovel blindly or repeatedly shovel the shoveled cat litter during cleaning.

U.S. Pat. No. 12,454,991 discloses a cat litter basin, which is provided with a plurality of openings for pets to enter and exit and ventilation, and at the same time, the bottom of the cat litter basin is textured to prevent the litter from sticking to the bottom of the container. However, this kind of cat litter basin needs additional cleaning tools when cleaning, and it is time-consuming and laborious to scoop up the cat litter accurately when cleaning.

U.S. Pat. No. 18,344,872 discloses a pet cat litter basin and a control method thereof. The cat litter basin automatically cleans the excrement covered with cat litter in the cat litter basin through a driving device and a transmission element, and deodorizes the cat litter basin, thereby releasing the hands of a user. However, this kind of cat litter basin has a complicated structure, complicated steps and a poor flexibility, which cannot meet the needs of users well.

Based on the above problems, it is necessary to provide a brand-new cat litter basin, which does not need additional cleaning tools to clean cat litter and reduces the occupied space. At the same time, the cat litter basin is convenient and simple to clean, which can improve the cleaning efficiency and experience of users.

SUMMARY

The present invention provides a cat litter basin convenient for cleaning, which includes an outer frame and an inner frame; and
  wherein, the outer frame has a length extending along an axial direction and a width extending along a lateral direction; the outer frame extends upward along a length direction to form a side wall, and the side wall is provided with a slope with a gradually decreasing height along the length direction; and
  wherein, the inner frame comprises a shovel plate, and the shovel plate extends upwards along the length direction to form a pedal; the shovel plate and the pedal are both provided with a plurality of sieve holes, and the pedal is provided with a plurality of protrusions; and
  wherein, the inner frame is provided with a litter baffle which is arranged at a bottom of the pedal and inclines to a bottom of the outer frame, and one side of the litter baffle close to the shovel plate is provided with a litter leakage place; and
  wherein the inner frame is able to slide in the outer frame along the length direction.

The present invention further provides a cat litter basin convenient for cleaning, which includes a cover and a main body; and
  wherein the main body comprises an outer frame and an inner frame; and
  wherein, the outer frame has a length extending along an axial direction and a width extending along a lateral direction; the outer frame extends upward along a length direction to form a side wall, and the side wall is provided with a slope with a gradually decreasing height along the length direction; and
  wherein, the inner frame comprises a shovel plate, and the shovel plate extends upwards along the length direction to form a pedal; the shovel plate and the pedal are both provided with a plurality of sieve holes, and the pedal is provided with a plurality of protrusions; and
  wherein, the inner frame is provided with a litter baffle which is arranged at a bottom of the pedal and inclines to a bottom of the outer frame, and one side of the litter baffle close to the shovel plate is provided with a litter leakage place; and
  wherein, the outer frame is formed with a front wall along a width direction, and the front wall is provided with a notch which is adapted to the pedal and configured to guide and support the pedal, and the inner frame is able to slide in the outer frame along the length direction; and
  wherein one side of the cover is provided with an entrance, and the cover is buckled above the main body.

The present invention further provides a method for cleaning animal filth, which includes providing a cat litter basin convenient for cleaning, wherein the cat litter basin comprises an outer frame and an inner frame; and
  wherein, the outer frame has a length extending along an axial direction and a width extending along a lateral direction; the outer frame extends upward along a length direction to form a side wall, and the side wall is provided with a slope with a gradually decreasing height along the length direction; and
  wherein, the inner frame comprises a shovel plate, and the shovel plate extends upwards along the length direction to form a pedal; the shovel plate and the pedal are both provided with a plurality of sieve holes, and the pedal is provided with a plurality of protrusions; and
  wherein, the inner frame is provided with a litter baffle which is arranged at a bottom of the pedal and inclines to a bottom of the outer frame, and one side of the litter baffle close to the shovel plate is provided with a litter leakage place; and
  wherein the inner frame is able to slide in the outer frame along the length direction; and
  the method comprises the following steps:
  placing the inner frame in the outer frame; and
  putting cat litter into the inner frame; and
  when there is filth in the cat litter basin, screening out the filth through the inner frame and cleaning.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the detailed description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF DRAWINGS

In order to explain the technical solution of this application more clearly, the drawings needed in the implementation will be briefly introduced below. Obviously, the drawings described below are only some implementations of this application. For those skilled in the art, other drawings can be obtained according to these drawings without creative work.

Figure 1:
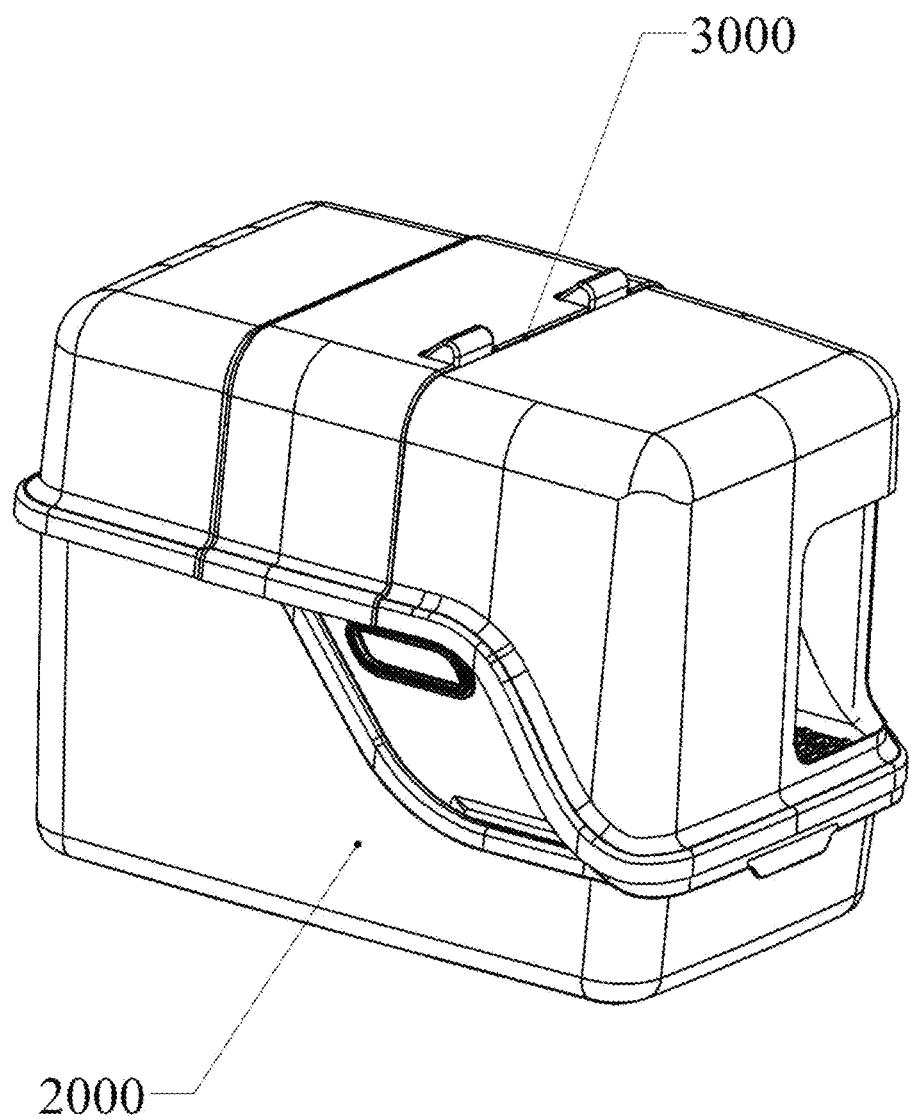
FIG. 1 is a schematic diagram of a cat litter basin in the application of the present invention.

In the figures:
minimum space state (1001); maximum space state (1002); main body (2000); outer frame (2100); length (l); side wall (2120); inner side surface (2121); slope (2122); width (d); front wall (2140); notch (2141); rear wall (2150); inner frame (2200); shovel plate (2210); upper surface (2220); first rib (2221); lower surface (2230); second rib (2231); shovel end (2240); connecting part (2250); arc-shaped structure (2251); pedal (2260); protrusion (2261); sieve hole (2262); clamping end (2263); litter baffle (2270); litter leakage place (2271); litter retaining wall (2272); handle (2280); hole (2290); soft rubber clasp (2291); cover (3000); front top cover (3100); shielding plate (3110); entrance (3120); middle top cover (3200); bump (3210); rear top cover (3300); bayonet (3310).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As a preferred embodiment of the application of the present invention, in order to clean the cat litter basin without additional cleaning tools and reduce the occupied space, at the same time, in order to make the cleaning of the cat litter basin convenient and simple, and improve the cleaning efficiency and experience of users, the application of the present invention provides a cat litter basin which is convenient to clean.

Figure 2:
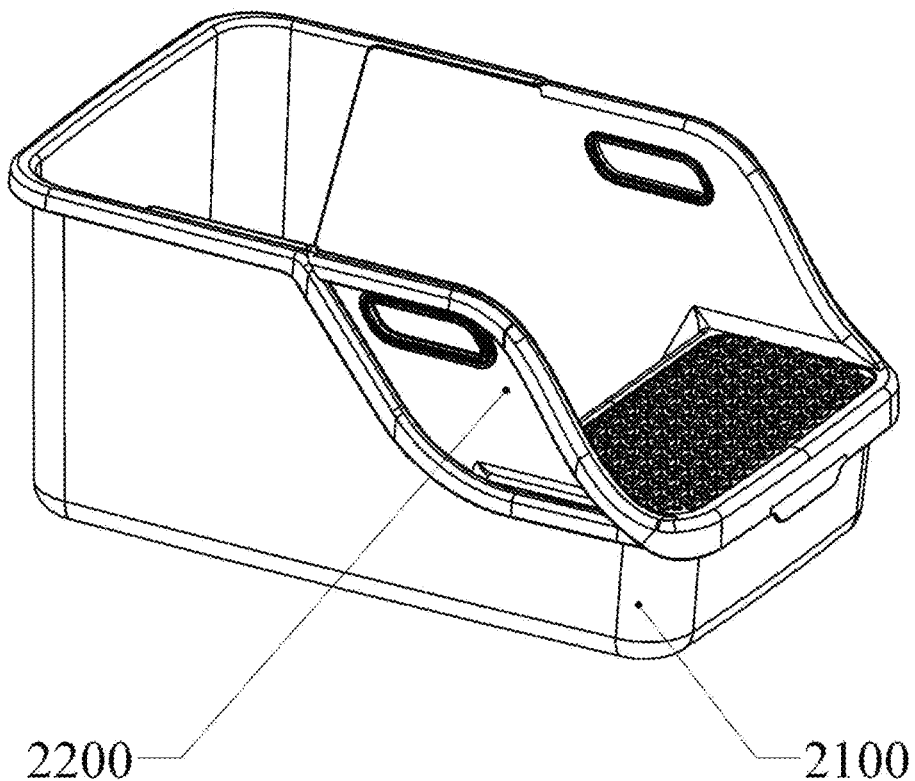
FIG. 2 is a schematic diagram of the main body in the application of the present invention.

Referring to FIG. 1, the cat litter basin convenient for cleaning includes a cover 3000 and a main body 2000. Referring to FIG. 2, the main body 2000 includes an outer frame 2100 and an inner frame 2200.

Figure 3:
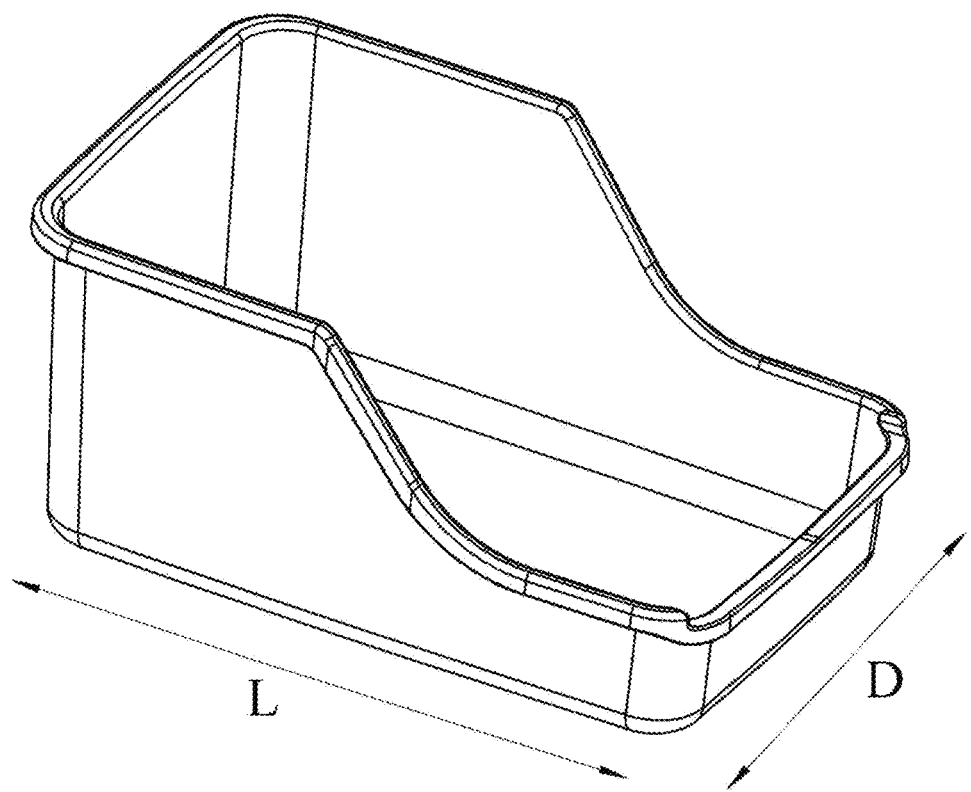
FIG. 3 is a schematic view of an outer frame in the application of the present invention.
Figure 4:
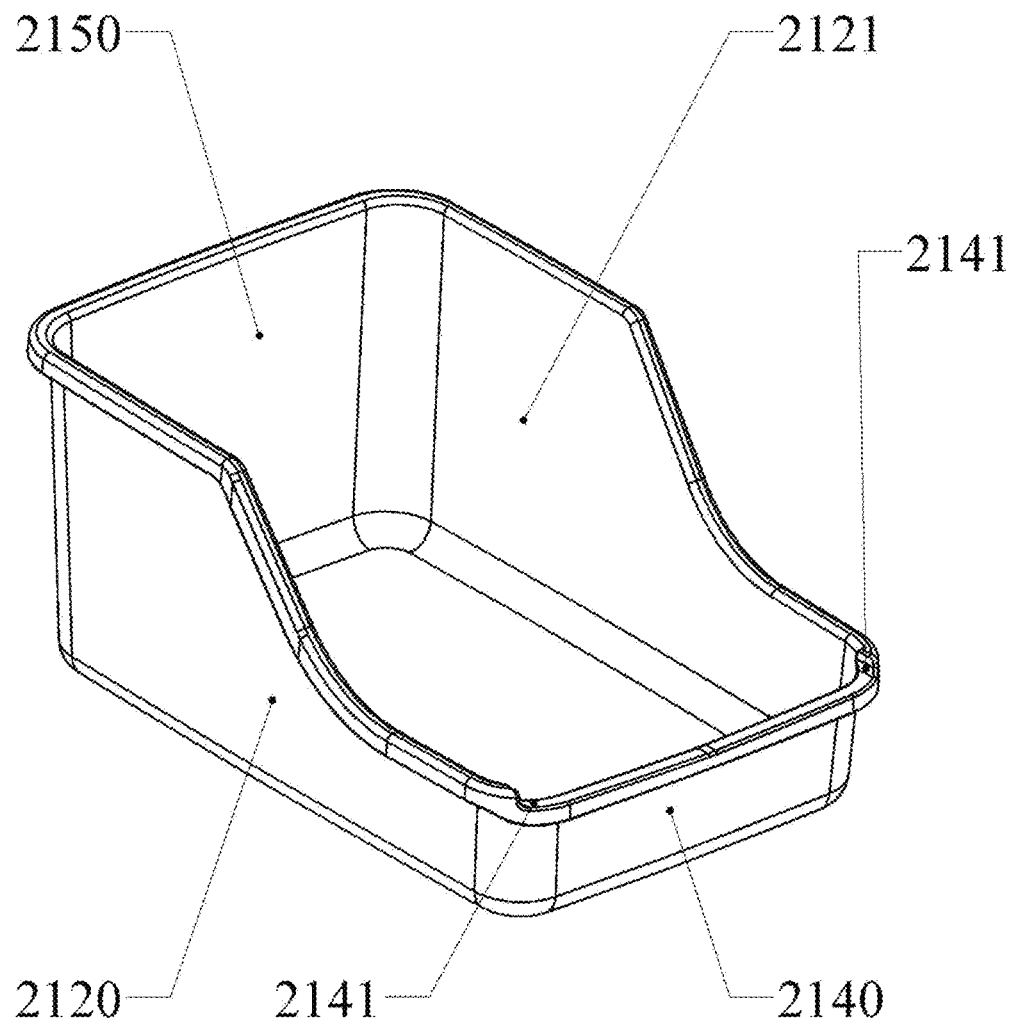
FIG. 4 is a schematic diagram of an outer frame in the application of the present invention.

Referring to FIGS. 3 and 4, the outer frame 2100 has a length L extending in the axial direction and a width D extending in the lateral direction. Among them, the outer frame 2100 extends upward along the direction of the length L to form a side wall 2120, and the outer frame 2100 forms a front wall 2140 and a rear wall 2150 along the direction of the width D.

In this embodiment, the side wall 2120 has two sides. The side wall 2120, the front wall 2140 and the rear wall 2150 cooperate together, so that the outer frame 2100 is formed into a rectangle.

In other embodiments (not shown in the figure), the outer frame 2100 can also have other structures like irregular shapes and curved edge shapes, including: an ellipsoid, which is a three-dimensional elliptical shape, and the lengths of its three principal axes can be different; a cylinder, which is a shape formed by the rotation of a straight line along a fixed curve; a cone, which is a shape formed by a straight line rotating along a fixed point; a hyperboloid, which is a shape formed by the rotation of a curve along a fixed curve; a paraboloid, which is a shape formed by the rotation of a straight line along a fixed parabola; or other structural shapes that can be used for the frame.

Figure 5:
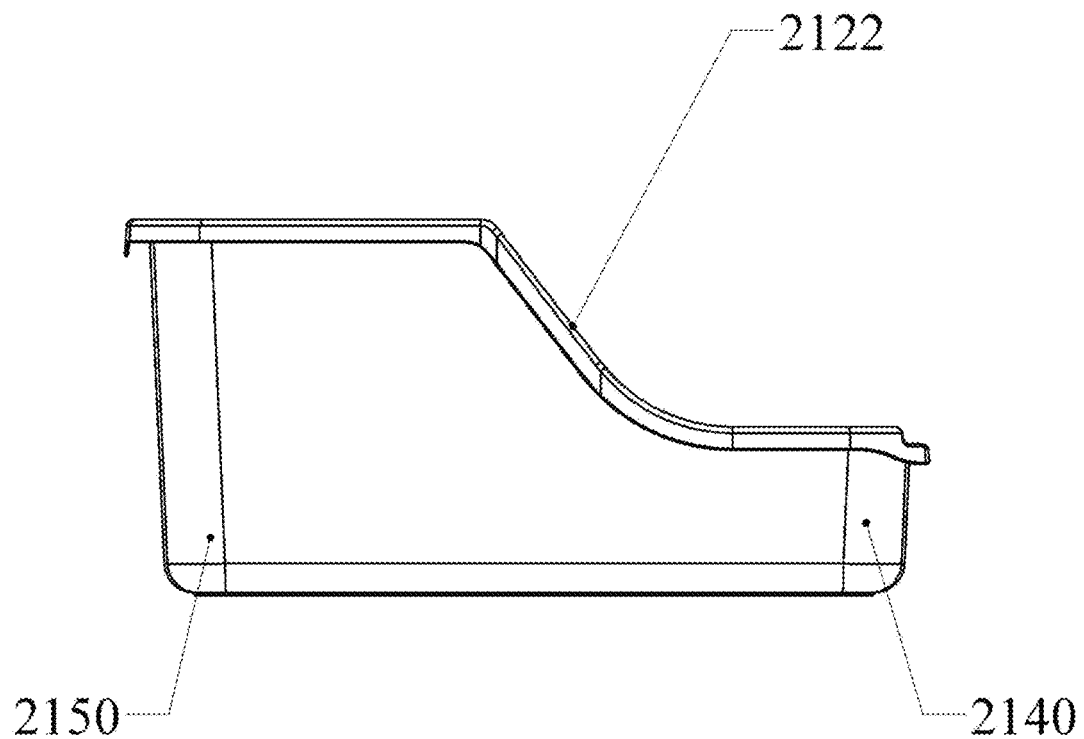
FIG. 5 is a schematic view of an outer frame in the application of the present invention.
Figure 6:
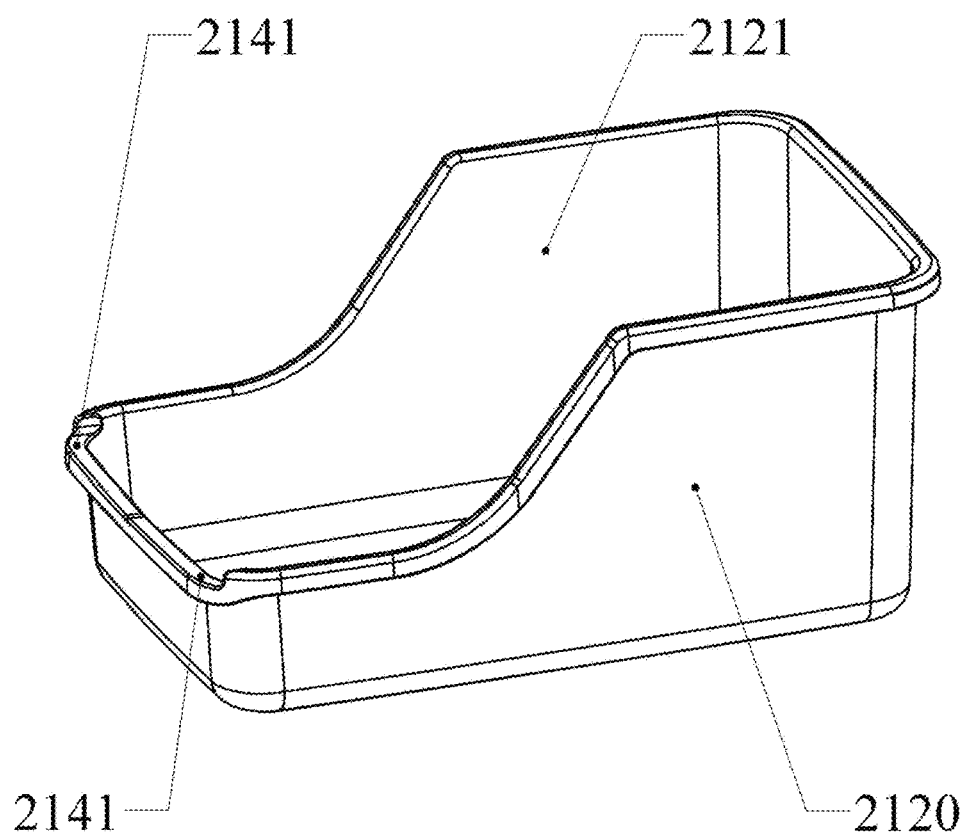
FIG. 6 is a schematic diagram of an outer frame in the application of the present invention.

Further, as shown in FIG. 5, the side wall 2120 is provided with a slope 2122 with a gradually decreasing height along the length L. At least part of the slope 2122 has an arc-shaped structure with a curved radian.

Further, the front wall 2140 and the rear wall 2150 are located at both ends of the slope 2122, and their heights are the same as those of both ends of the slope 2122, that is, the front wall 2140 and the rear wall 2150 are at the same level with both ends of the slope 2122. The height of the rear wall 2150 is higher than that of the front wall 2140.

Referring to FIG. 2 and FIG. 4, the side wall 2120 has an inner side surface 2121. When the inner frame 2200 is connected to the outer frame 2100, the inner side surface 2121 is attached to the inner frame 2200 to prevent the inner frame 2200 from shifting during sliding. In this embodiment, the inner frame 2200 is inserted into the outer frame 2100, that is, the inner frame 2200 is directly fixed into the outer frame 2100 by inserting, and the two can be detached at any time. The top edges of the inner frame 2200 and the outer frame 2100 are matched and parallel with each other, thus ensuring the stability and structural compactness after insertion.

Figure 7:
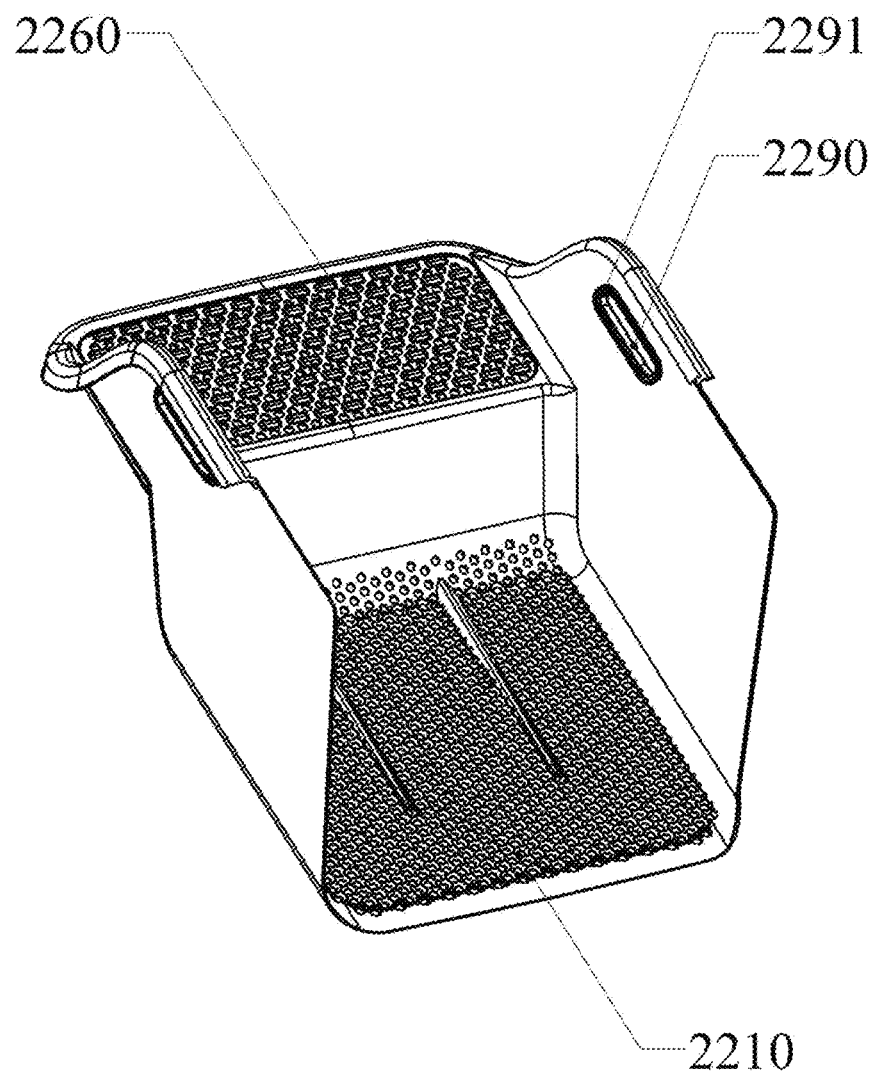
FIG. 7 is a schematic view of an inner frame in the application of the present invention.

Referring to FIGS. 2 and 7, the inner frame 2200 includes a shovel plate 2210 and a pedal 2260. When the inner frame 2200 is inserted into the outer frame 2100, the shovel plate 2210 is attached to the bottom of the outer frame 2100, and the pedal 2260 is buckled and connected to the front wall 2140, thereby reducing the center of gravity of the pedal 2260, increasing the connection stability between the pedal 2260 and the outer frame 2100, and preventing pets from stepping over the pedal 2260.

Further, as shown in FIGS. 2 to 6, the front wall 2140 is provided with a notch 2141, the width of which is matched with the width of the pedal 2260, and the notch 2141 is used for guiding and supporting the pedal 2260, further preventing the inner frame 2200 from deviating during sliding.

Figure 8:
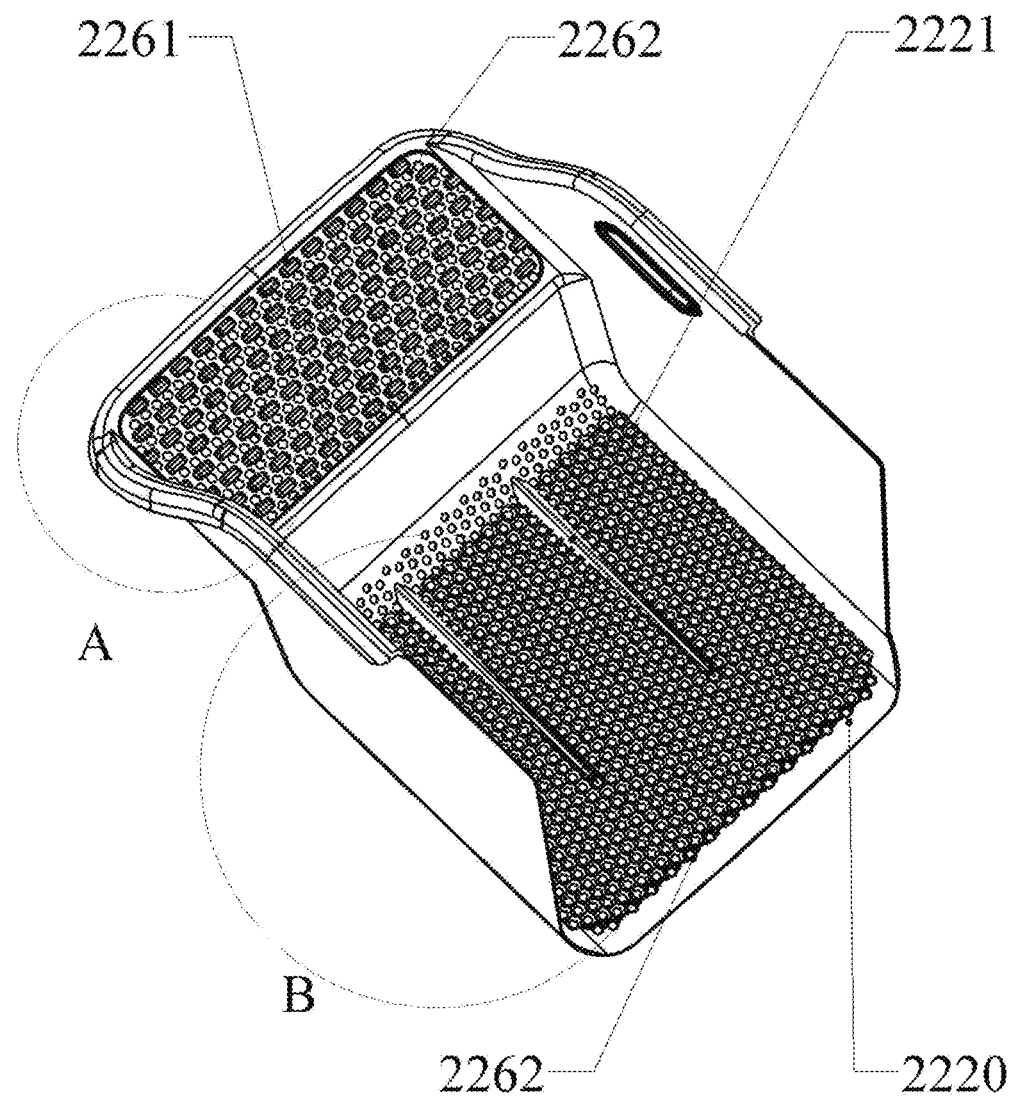
FIG. 8 is a schematic diagram of an inner frame in the application of the present invention.
Figure 9:
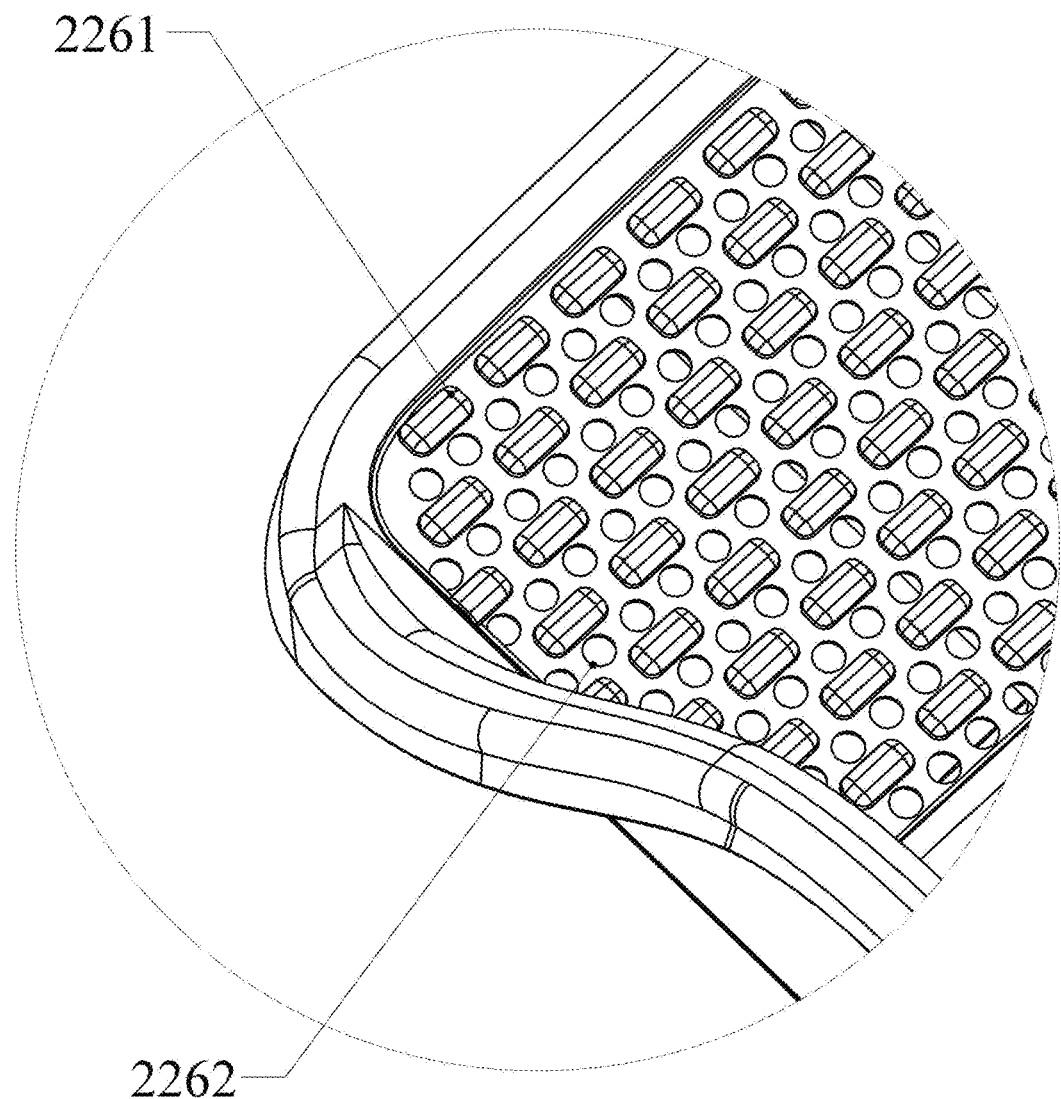
FIG. 9 is an enlarged view at A in FIG. 8.
Figure 10:
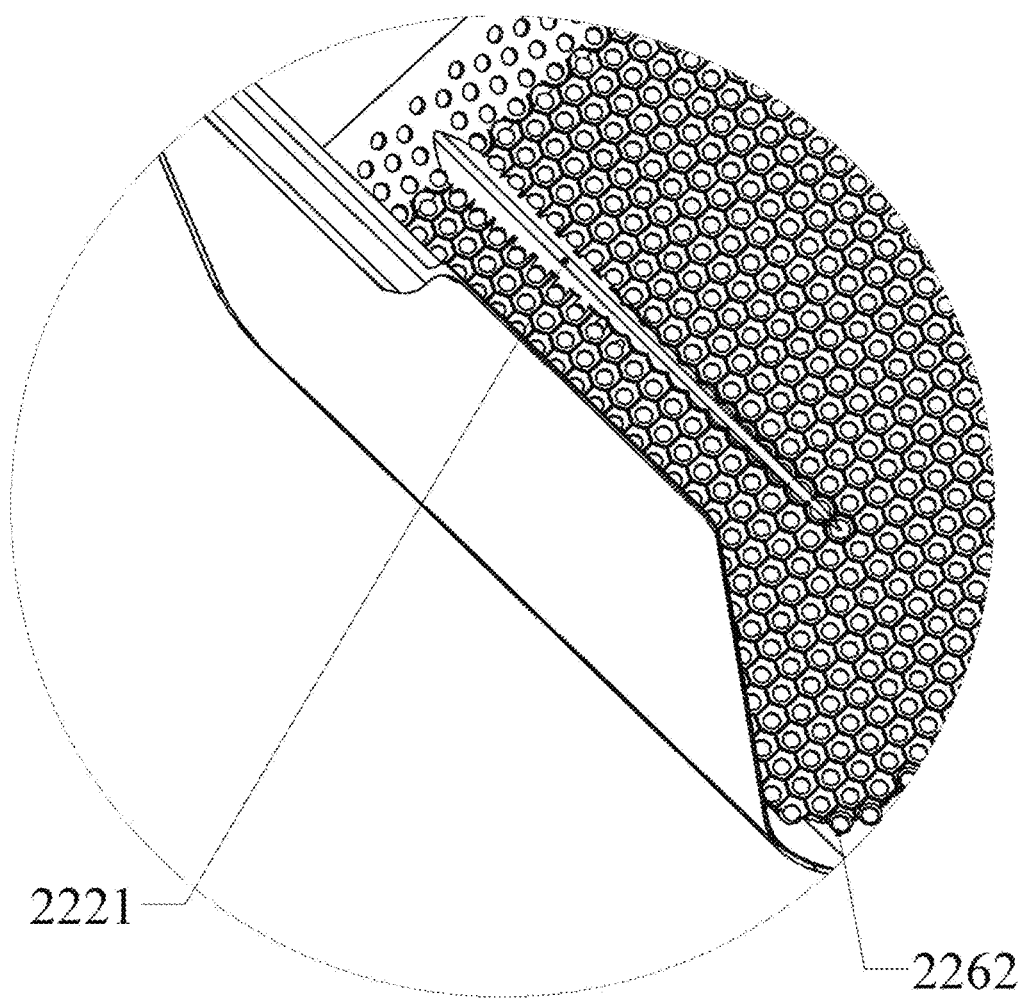
FIG. 10 is an enlarged view at B in FIG. 8.
Figure 11:
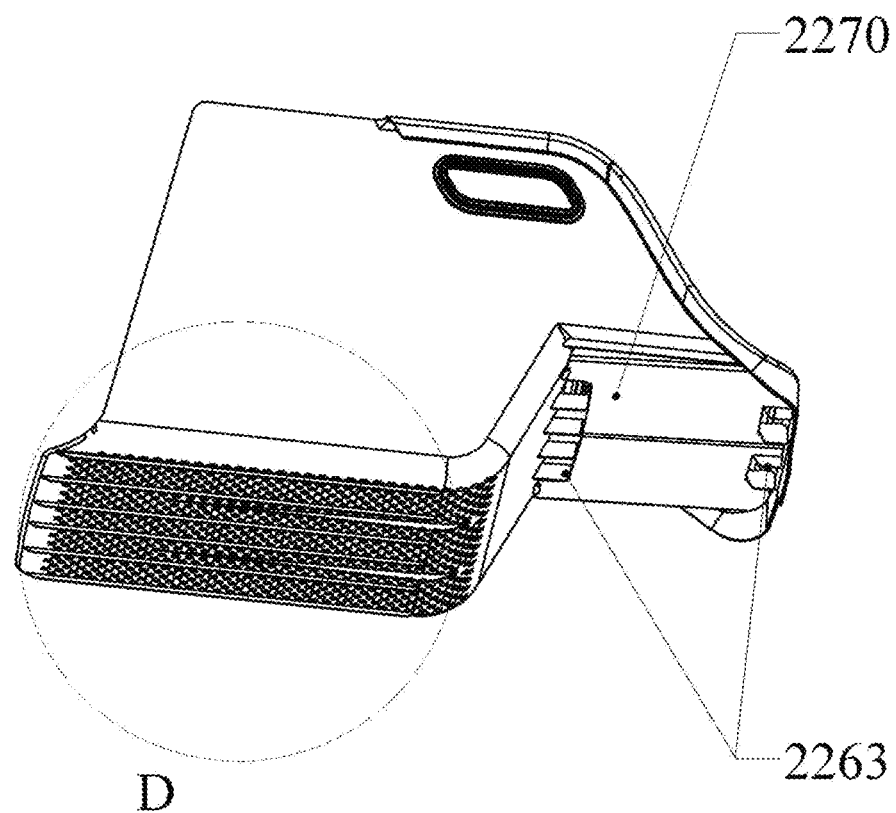
FIG. 11 is a schematic diagram of an inner frame in the application of the present invention.
Figure 12:
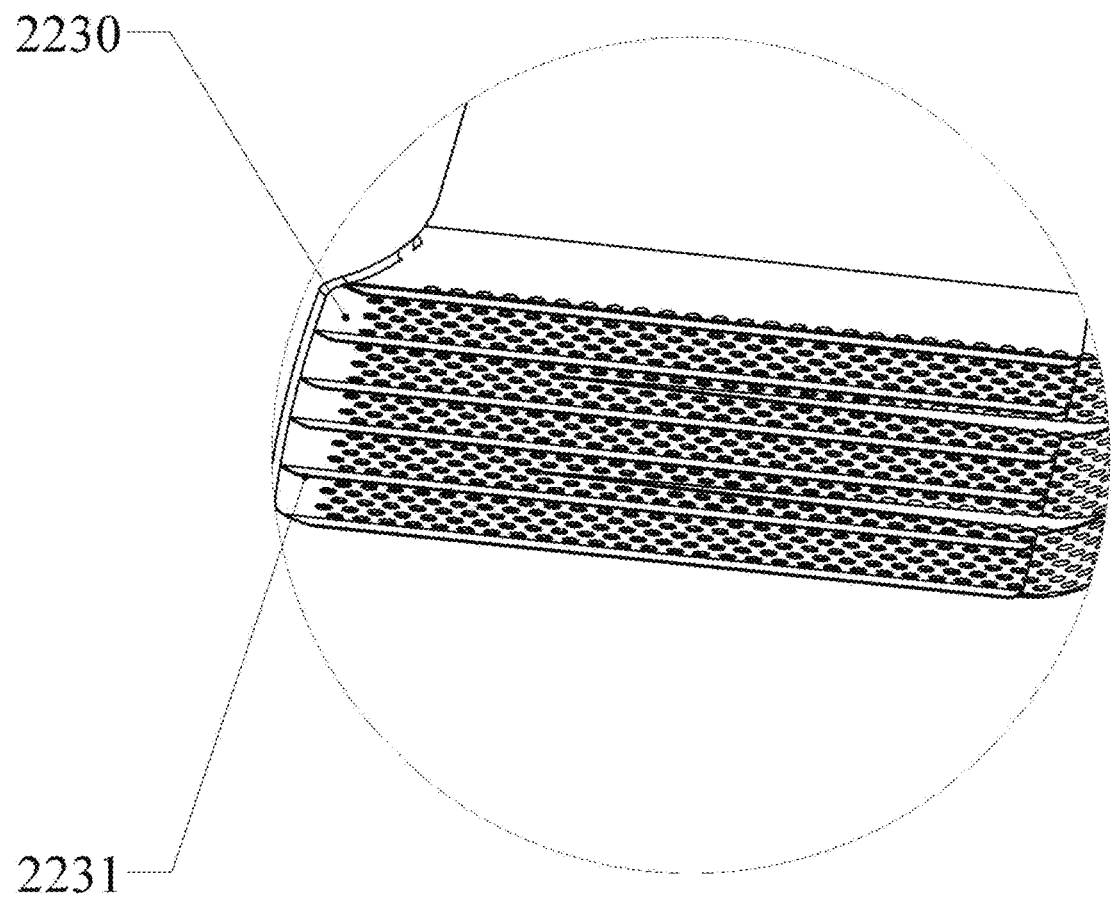
FIG. 12 is an enlarged view at D in FIG. 11.

Referring to FIG. 7, the pedal 2260 is formed by the shovel plate 2210 extending upward along the direction of the length L. Referring to FIGS. 8 to 10, both the shovel plate 2210 and the pedal 2260 have a plurality of sieve holes 2262, which are arranged in a linear array on the shovel plate 2210 and the pedal 2260 and penetrate through the shovel plate 2210 and the pedal 2260. At the same time, the pedal 2260 is further provided with a plurality of protrusions 2261, which are arranged on the pedal 2260 in a linear array and at intervals.

In a linear array structure, in order to accurately copy one or more shape features, this object can be placed and arranged according to personal wishes according to the setting of the number of rows, columns and center points. In other embodiments (not shown in the figure), the protrusions 2261 and the sieve holes 2262 can also be arranged in other ways, such as circumferential array distribution, which is a special array way and can evenly distribute a plurality of objects on a circumference.

Referring to FIG. 8 to FIG. 13, the shovel plate 2210 has an upper surface 2220, a lower surface 2230 and a shovel end 2240, the shovel end 2240 has an upward curvature, and the height of the shovel end 2240 is higher than that of the upper surface 2220 and the lower surface 2230. The curvature of the shovel end 2240 allows the shovel end 2240 to be used as a shovel, so that the cat litter basin can clean up filth without using additional tools, thereby saving space.

Referring to FIGS. 8 to 10, the upper surface 2220 is formed with first ribs 2221 protruding upward, and the closer the first ribs 2221 are to one end of the pedal 2260, the larger the cross-sectional area is. That is, the farther away from the pedal 2260, the smaller the cross-sectional areas of the first ribs 2221. The design of the first ribs 2221 can improve the strength of the cat litter basin and prevent the cat litter basin from cracking.

Referring to FIG. 8 to FIG. 12, the lower surface 2230 is provided with second ribs 2231 protruding downward, and the second ribs 2231 are arranged on the lower surface 2230 in a linear array at intervals. The height of both ends of the second ribs 2231 gradually decreases, and the cross-sectional area gradually decreases. The overall shape of the second rib 2231 is trapezoidal. The second rib 2231 helps to reduce the friction of the inner frame 2200 sliding in the outer frame 2100.

In other embodiments (not shown in the figure), the shape and structure of the second rib 2231 can also be a square structure, a diamond structure, a polygonal structure, an elliptical structure or other curved edge structures and irregular graphic structures.

Figure 13:
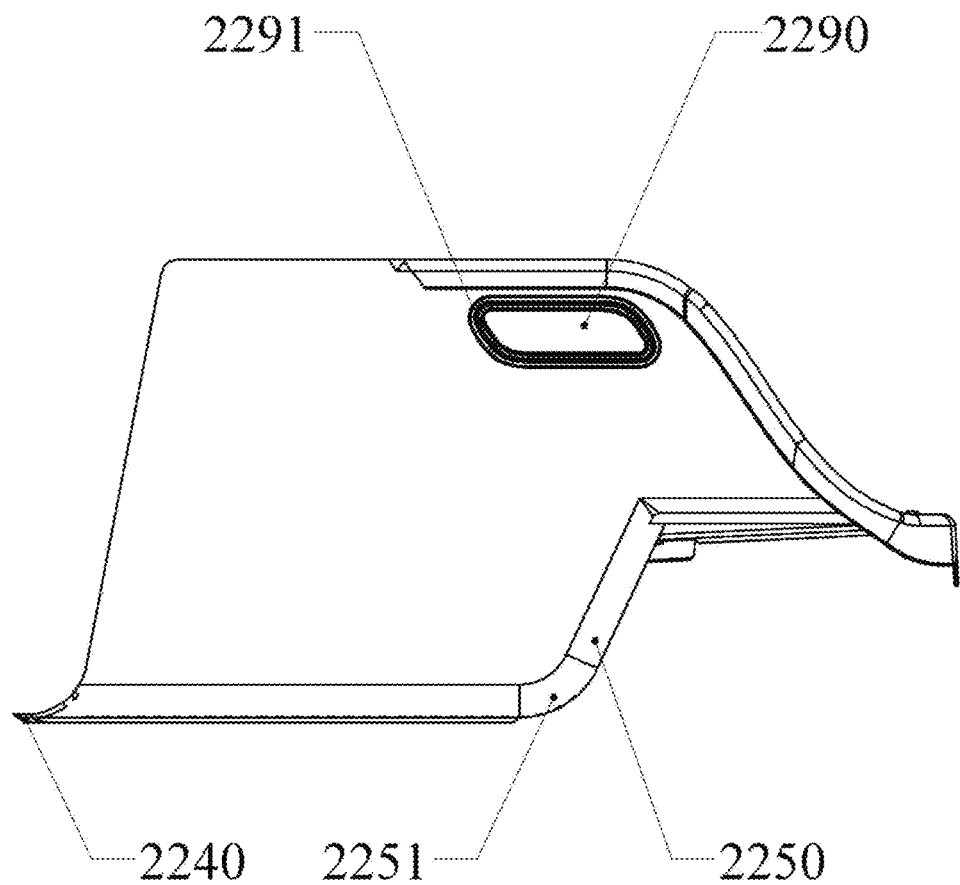
FIG. 13 is a schematic diagram of an inner frame in the application of the present invention.

Referring to FIG. 13, the shovel plate 2210 and the pedal 2260 are connected by a connecting part 2250, and part of the connecting part 2250 is an arc-shaped structure 2251, which is convenient for the inner frame 2200 to slide in the outer frame 2100. The shovel plate 2210 and the pedal 2260 are integrally formed.

The integrated connection mode has many advantages, such as high efficiency, short production cycle and fast production speed; reduced costs: integrated molding can improve production efficiency, thus reducing manufacturing costs; firm structure: the integrated structure is firm and firm; good stability: the integrated product has good stability and other advantages.

In other embodiments (not shown in the figure), the connection between the shovel plate 2210 and the pedal 2260 can also be mechanical connection, such as screw connection, plug connection, pin connection and tenon connection, or adhesive connection, or clamp connection and other various connection methods.

Referring to FIG. 11 to FIG. 14, the inner frame 2200 is provided with a litter baffle 2270, and a plurality of clamping ends 2263 are arranged below the pedal 2260. Through the clamping ends 2263, the litter baffle 2270 can be clamped below the pedal 2260 and inclined to the bottom of the outer frame 2100, and the litter baffle 2270 is provided with a litter leakage place 2271 at one side close to the shovel plate 2210, so that it is convenient for the cat litter falling on the litter baffle 2270 to slide back into the outer frame 2100.

In some embodiments (not shown in the figure), the litter baffle 2270 and the pedal 2260 can also be connected by other mechanical connection structures, such as screw connection, rivet connection, plug-in, pin connection, tenon connection, or bonding, or welding and other various connection forms.

Figure 14:
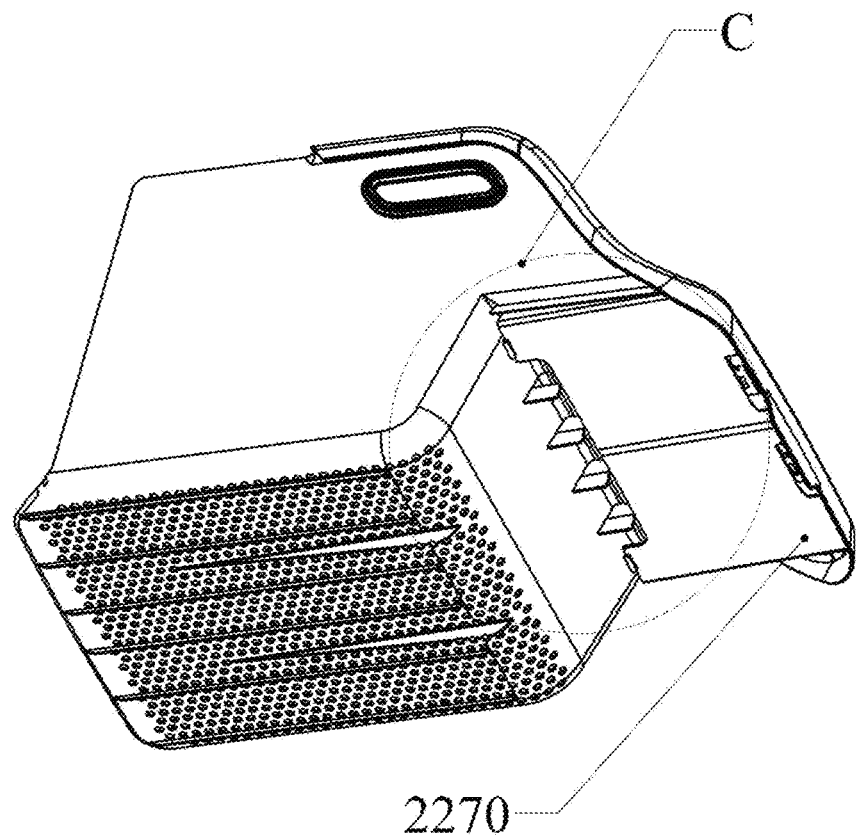
FIG. 14 is a schematic diagram of an inner frame in the application of the present invention.
Figure 15:
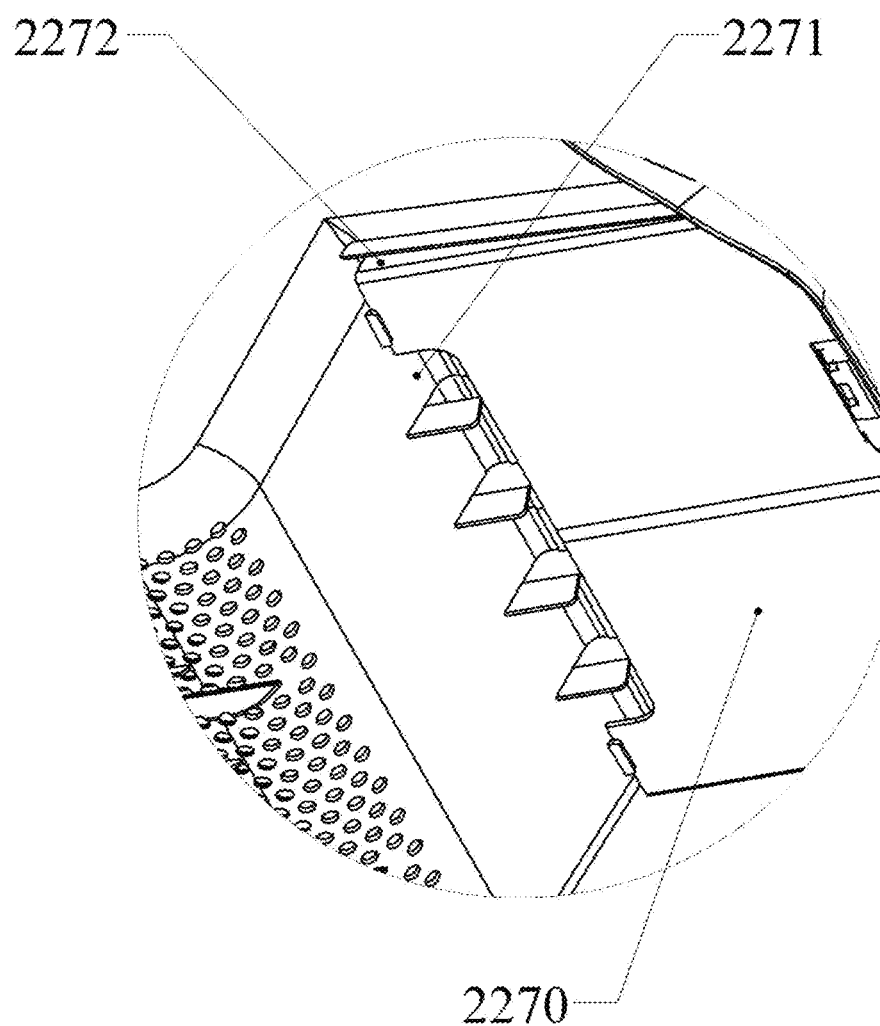
FIG. 15 is an enlarged view at C in FIG. 13.
Figure 16:
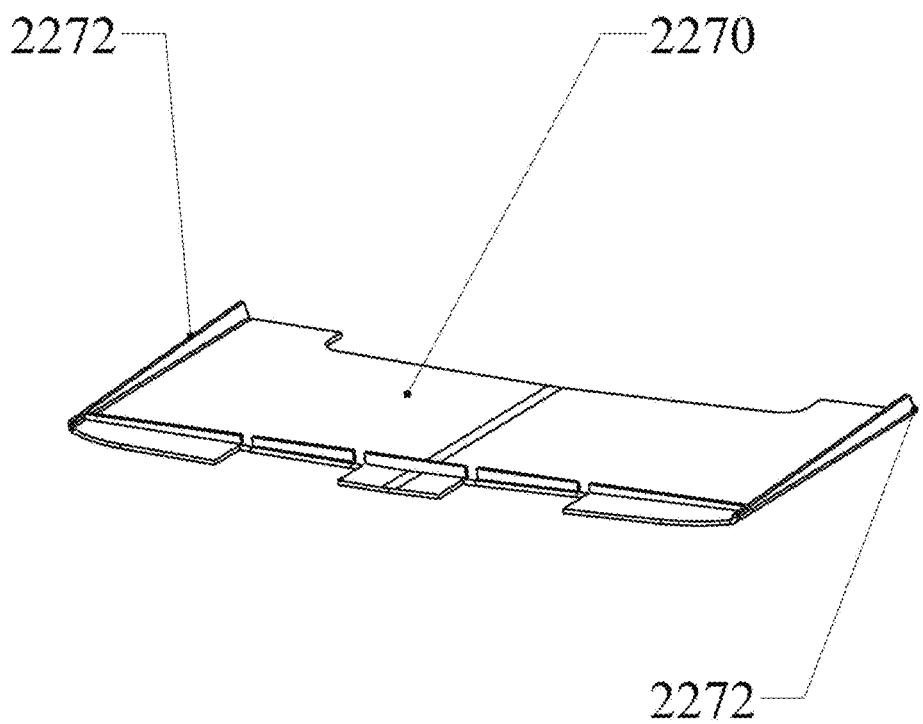
FIG. 16 is a schematic diagram of the litter baffle in the application of the present invention.

Referring to FIGS. 14 to 16, the litter baffle 2270 has a litter retaining wall 2272 extending upward and protruding from the litter baffle 2270. The litter retaining wall 2272 can prevent the cat litter from splashing and falling out of the cat litter basin.

Further, as shown in FIGS. 7 and 13, holes 2290 are formed on both sides of the inner frame 2200, and the inner ring of the hole 2290 is provided with a soft rubber clasp 2291, and the holes 2290 are configured as handles for users to lift the inner frame 2200 for cleaning. The soft rubber clasp 2291 is fixedly connected or clamped with the inner frame 2200, which reduces the pressure of the hole 2290 on the user when the user lifts the inner frame 2200 and improves the comfort.

In other embodiments (not shown in the figure), the connection mode between the soft rubber clasp 2291 and the inner frame 2200 can also be mechanical connection, such as screw connection, plug connection, pin connection and tenon connection, or adhesive connection, or clamp connection, or other various connection forms.

Figure 17:
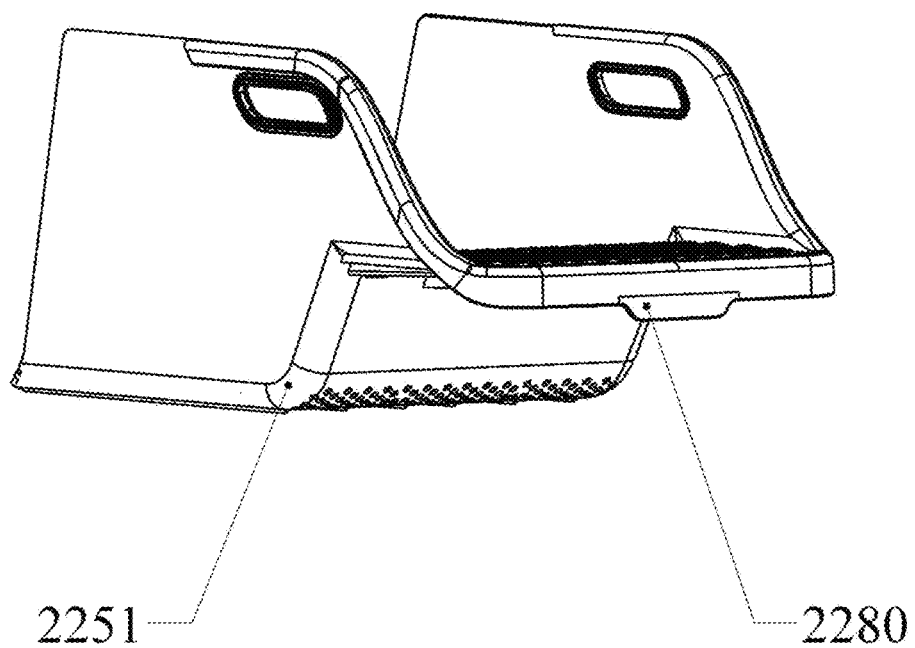
FIG. 17 is a schematic diagram of an inner frame in the application of the present invention.

Referring to FIG. 17, the pedal 2260 extends downward and is provided with a handle 2280. Through the handle 2280, the inner frame 2200 is able to slide in the outer frame 2100 along the direction of the length L. When the inner frame 2200 slides in the outer frame 2100, it has a maximum sliding distance. When the inner frame 2200 is at the maximum sliding distance, the connecting part 2250 will contact the front wall 2140, and the front wall 2140 will limit the connecting part 2250, so that the inner frame 2200 can no longer be pulled.

Figure 18:
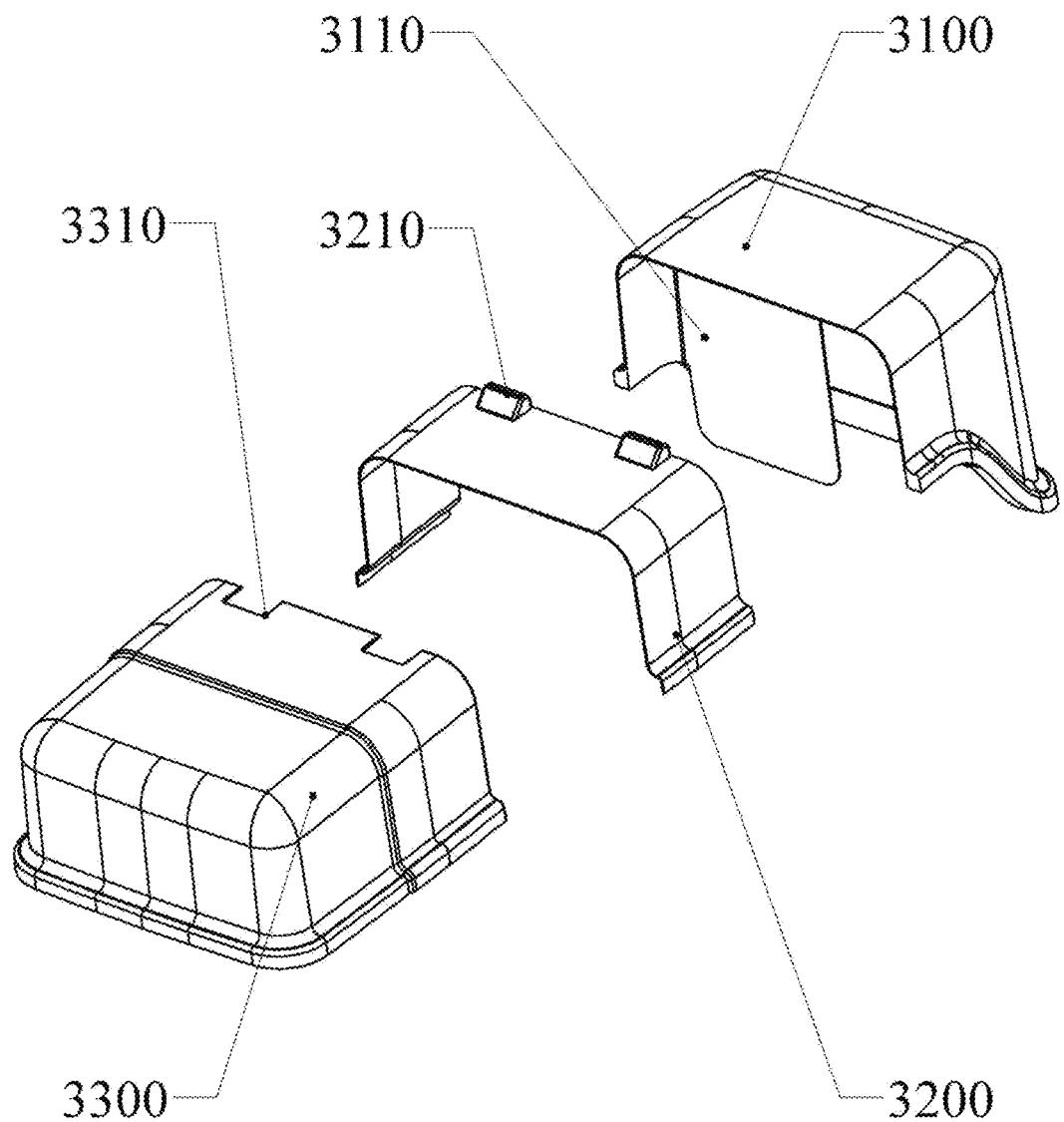
FIG. 18 is an exploded view of the cover in the application of the present invention.

Referring to FIGS. 1 and 18, the cover 3000 is buckled above the main body 2000. The cover 3000 includes a front top cover 3100, a middle top cover 3200 and a rear top cover 3300. The middle top cover 3200 is provided with a bump 3210, which is close to one side of the front top cover 3100. The rear top cover 3300 is provided with a bayonet 3310 near one side of the middle top cover 3200.

The middle top cover 3200 is able to slide along the direction of the length L relative to the front top cover 3100 and the rear top cover 3300. When the middle top cover 3200 slides, the bayonet 3310 will limit the bump 3210.

Figure 19:
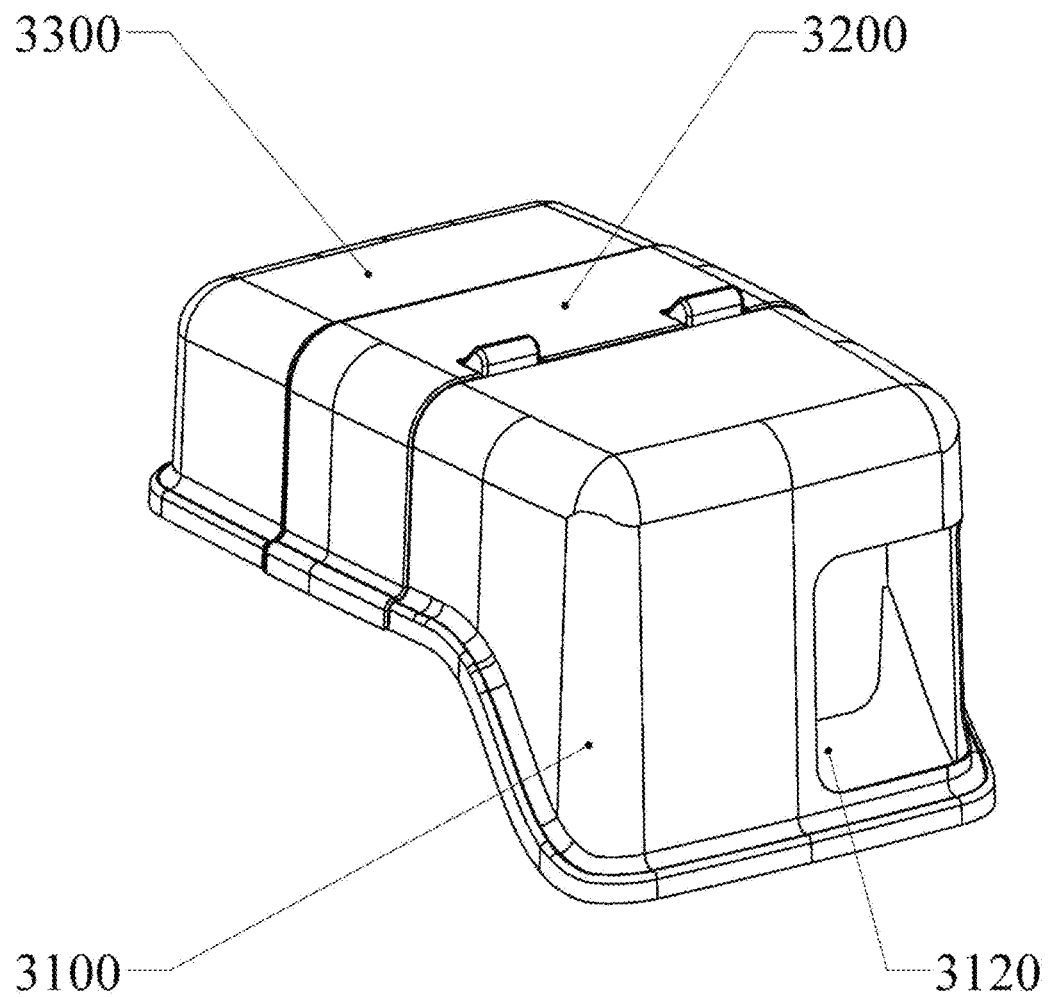
FIG. 19 is a schematic view of the cover in the application of the present invention.

As shown in FIG. 19, the front top cover 3100 is provided with an entrance 3120, and the inner side of the front top cover 3100 is provided with a shielding plate 3110 corresponding to the entrance 3120. The width of the shielding plate 3110 is smaller than the inner width of the front top cover 3100, so that a passage is reserved for pets to enter and exit at one side, the moving path of pets on the pedal 2260 is increased, and the efficiency of cat litter falling back into the cat litter basin is improved.

Further, when the inner frame 2200 slides in the outer frame 2100, the cat litter basin has a maximum space state 1002 and a minimum space state 1001.

Figure 20:
FIG. 20 is a schematic diagram of the minimum space state of the cat litter basin in the application of the present invention.

Referring to FIG. 20, when the cat litter basin is in the minimum space state 1001, the inner frame 2200 and the outer frame 2100 are attached to each other, and the middle top cover 3200 slides and is located in the rear top cover 3300, at this time, the bump 3210 contact with the bayonet 310.

Figure 21:
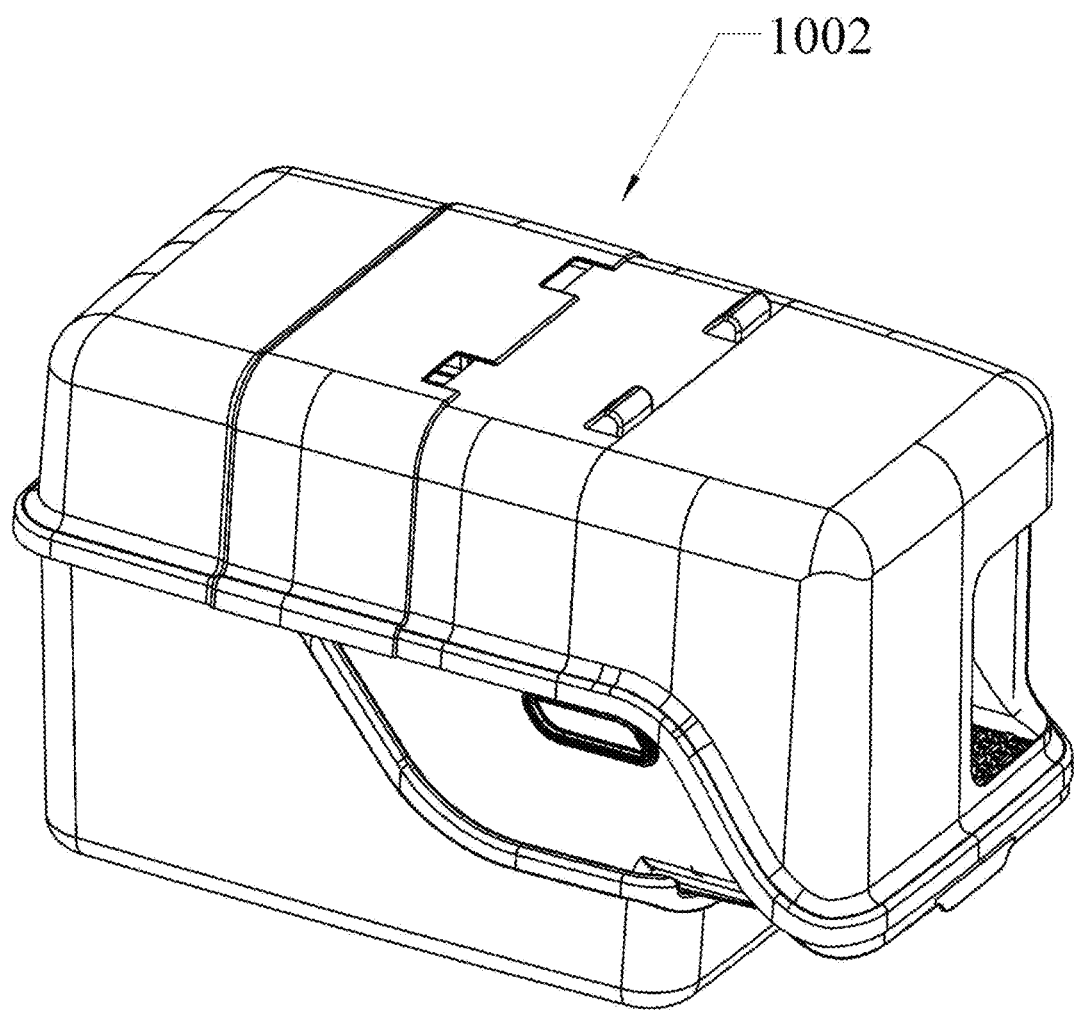
FIG. 21 is a schematic diagram of the maximum space state of the cat litter basin in the application of the present invention.

Referring to FIG. 21, when the cat litter basin is in the maximum space state 1002, the inner frame 2200 is far away from the outer frame 2100, and the middle top cover 3200 is able to slide between the front top cover 3100 and the rear top cover 3300, thereby opening or closing the cat litter basin.

As a preferred implementation of the application of the present invention, the application of the present invention further provides a method for cleaning animal filth, wherein the method includes providing a cat litter basin convenient for cleaning.

First, it needs to fill the cat litter, put the inner frame 2200 into the outer frame 2100, and then put the cat litter into the inner frame 2200. Pets can move in the cat litter basin. When there is filth in the cat litter basin, the filth is screened out through the inner frame 2200 and cleaned. Specifically, when it is necessary to clean the filth, the inner frame 2200 is allowed to slide back and forth in the outer frame 2100 through the handle 2280 to screen the clean litter into the outer frame 2100, and the filth remains on the inner frame 2200. Then, the inner frame 2200 is taken out of the outer frame 2100, and the filth is dumped and cleaned.

Further, when an animal enters and exits from the cat litter basin, the plurality of protrusions 2261 are brought into contact with the animal's paws, so that the litter left on the paws enters the litter baffle 2270 through the plurality of sieve holes 2262, and then falls back to the inner frame 2200. After the filth is treated, the head of the inner frame 2200 is inserted obliquely downward into the outer frame 2100, and the inner frame 2200 is placed under the cat litter until the bottom surfaces of the inner frame 2200 and the outer frame 2100 are attached.

Through this cat litter basin and method, the filthy things in the cat litter basin can be cleaned more easily, and at the same time, the waste of cat litter basin can be reduced.

In this embodiment, the cat litter basin which is easy to clean is mainly used by animals. In the broad sense of the application of the present invention, the design concept of the cat litter basin can be applied to many fields that need material separation and cleaning. The following are some possible application fields, including: gardening: in gardening, this design can be used to screen stones and other impurities in the soil; construction industry: in the construction industry, this design can be used to screen large-particle impurities in sand stone and cement; food industry: in the food industry, this design can be used to screen food raw materials, such as stones in rice; mining industry: in mining industry, this design can be used to screen impurities in ore; waste disposal: in waste disposal, this design can be used to screen recyclable materials and other fields. The key to the design of the application of the present invention is that it can conveniently separate and clean materials, and thus it may find its application in any field where such operation is needed. However, the specific application may require some adjustments to the design to adapt to different materials and environmental conditions.

To sum up, the cat litter basin provided by the present invention has many advantages, for example: it is convenient to clean, and the inner frame is able to slide in the outer frame along the length direction, which makes the cleaning process more convenient, and it is not necessary to pour out the whole cat litter basin for cleaning; the design of sieve holes: the sieve holes on the shovel plate and pedal can make unused cat litter fall back into the cat litter basin, reducing the waste of cat litter; the design of protrusions: the protrusions on the pedal can help to remove the cat litter stuck on the cat paw, reduce the situation that the cat litter is taken out of the cat litter basin, and effectively prevent the cat litter from splashing out; the design of a cover: one side of the cover is provided with an entrance and exit, which can protect the privacy of cats and prevent cat litter from splashing outside.

The technical means disclosed in the solution of the present invention are not limited to the technical means disclosed in the above embodiments, but also include the technical solution composed of any combination of the above technical features. It should be pointed out that for those skilled in the art, several improvements and embellishments can be made without departing from the principle of the present invention, and these improvements and embellishments are also regarded as the protection scope of the present invention.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A cat litter basin convenient for cleaning, comprising an outer frame and an inner frame; and
    wherein, said outer frame has a length extending along an axial direction and a width extending along a lateral direction; and said outer frame extends upward along a length direction to form a side wall, and said side wall is provided with a slope with a gradually decreasing height along said length direction; and
    wherein, said inner frame comprises a shovel plate, and said shovel plate extends upwards along said length direction to form a pedal; and said shovel plate and said pedal are both provided with a plurality of sieve holes, and said pedal is provided with a plurality of protrusions; and
    wherein, said inner frame is provided with a litter baffle which is arranged at a bottom of said pedal and inclines to a bottom of said outer frame, and one side of said litter baffle close to said shovel plate is provided with a litter leakage place; and
    wherein said inner frame is able to slide in said outer frame along said length direction.

2. The cat litter basin according to claim 1, wherein said outer frame is formed with a front wall and a rear wall along direction of said width; and said front wall and said rear wall are located at both ends of said slope respectively, and a height of said rear wall is higher than that of said front wall.

3. The cat litter basin according to claim 2, wherein at least part of said slope is arc-shaped and said front wall and said rear wall respectively have horizontal sidelines with a same height as both ends of said slope.

4. The cat litter basin according to claim 3, wherein said side wall has an inner side surface, which is attached to said inner frame, and said inner frame is inserted into said outer frame; and said shovel plate is attached to the bottom of said outer frame, and said pedal is buckled and connected to said front wall.

5. The cat litter basin according to claim 4, wherein said shovel plate has an upper surface, a lower surface and a shovel end, and said shovel end has an upward curved arc, and a height of said shovel end is higher than that of said upper surface and said lower surface.

6. The cat litter basin according to claim 5, wherein said upper surface protrudes upward to form first ribs, and cross-sectional areas of said first ribs gradually decrease along a direction away from said pedal.

7. The cat litter basin according to claim 6, wherein said lower surface is provided with second ribs protruding downwards and said second ribs are arranged on said lower surface at intervals in a linear array, and both ends of said second ribs have cross sections with decreasing heights.

8. The cat litter basin according to claim 7, wherein said shovel plate and said pedal are connected through a connecting part, at least part of said connecting part has an arc structure and said shovel plate and said pedal are integrally formed.

9. The cat litter basin according to claim 8, wherein said pedal extends downward and is provided with a handle, through which said inner frame is able to slide in said outer frame conveniently; and when sliding in said outer frame, said inner frame has a maximum sliding distance, and when said inner frame is at said maximum sliding distance, said connecting part is contacting with said front wall, and said front wall limits said connecting part.

10. The cat litter basin according to claim 9, wherein a plurality of said sieve holes are arranged on said shovel plate and said pedal in a linear array, the plurality of sieve holes penetrate through said shovel plate and said pedal, and the plurality of protrusions are arranged on said pedal in a linear array at intervals.

11. The cat litter basin according to claim 10, wherein a plurality of clamping ends is arranged below said pedal and said litter baffle can be clamped below said pedal through said clamping ends and said litter baffle has a litter retaining wall extending upward and protruding from said litter baffle.

12. The cat litter basin according to claim 11, wherein two sides of said inner frame are provided with holes, an inner ring of said hole is provided with soft rubber clasps, and said holes are configured as handles for a user to lift said inner frame for cleaning.

13. A cat litter basin convenient for cleaning, comprising a cover and a main body; and
    wherein said main body comprises an outer frame and an inner frame; and
    wherein, said outer frame has a length extending along an axial direction and a width extending along a lateral direction; and said outer frame extends upward along a length direction to form a side wall, and said side wall is provided with a slope with a gradually decreasing height along said length direction; and
    wherein, said inner frame comprises a shovel plate, and said shovel plate extends upwards along said length direction to form a pedal; and said shovel plate and said pedal are both provided with a plurality of sieve holes, and said pedal is provided with a plurality of protrusions; and
    wherein, said inner frame is provided with a litter baffle which is arranged at a bottom of said pedal and inclines to a bottom of said outer frame, and one side of said litter baffle close to said shovel plate is provided with a litter leakage place; and
    wherein, said outer frame is formed with a front wall along a width direction, and said front wall is provided with a notch which is adapted to said pedal and configured to guide and support said pedal, and said inner frame is able to slide in said outer frame along said length direction; and
    wherein one side of said cover is provided with an entrance, and said cover is buckled above said main body.

14. The cat litter basin according to claim 13, wherein said cover comprises a front top cover, a middle top cover and a rear top cover, and said middle top cover is able to slide along said length direction relative to said front top cover and said rear top cover, thereby opening or closing said cat litter basin.

15. The cat litter basin according to claim 14, wherein said entrance is located on said front top cover, and a shielding plate corresponding to said entrance is arranged inside said front top cover, and a width of said shielding plate is smaller than an internal width of said front top cover, so that a passage for pets to enter and leave is reserved at one side.

16. The cat litter basin according to claim 15, wherein one side of said middle top cover close to said front top cover is provided with a bump, and a side of said rear top cover close to said middle top cover is provided with a bayonet, and when said middle top cover slides, said bayonet will limit said bump.

17. The cat litter basin according to claim 16, wherein when said inner frame slides in said outer frame, said cat litter basin has a maximum space state and a minimum space state; and
    when said cat litter basin is in said minimum space state, said inner frame and said outer frame are attached to each other, said middle top cover is located in said rear top cover, and said bump is in contact with said bayonet; and
    when said cat litter basin is in said maximum space state, said inner frame is far away from said outer frame, and said middle top cover is able to slide between said front top cover and said rear top cover.

18. A method for cleaning animal filth, comprising providing a cat litter basin convenient for cleaning, wherein said cat litter basin comprises an outer frame and an inner frame; and
    wherein, said outer frame has a length extending along an axial direction and a width extending along a lateral direction; and said outer frame extends upward along a length direction to form a side wall, and said side wall is provided with a slope with a gradually decreasing height along said length direction; and
    wherein, said inner frame comprises a shovel plate, and said shovel plate extends upwards along said length direction to form a pedal; and said shovel plate and said pedal are both provided with a plurality of sieve holes, and said pedal is provided with a plurality of protrusions; and
    wherein, said inner frame is provided with a litter baffle which is arranged at a bottom of said pedal and inclines to a bottom of said outer frame, and one side of said litter baffle close to said shovel plate is provided with a litter leakage place; and
    wherein said inner frame is able to slide in said outer frame along said length direction; and
    the method comprises the following steps:
    placing said inner frame in said outer frame; and
    putting cat litter into said inner frame; and
    when there is filth in said cat litter basin, screening out said filth through said inner frame and cleaning.

19. The method according to claim 18, wherein when an animal enters and exits from said cat litter basin, a plurality of said protrusions are brought into contact with paws of animal, so that said litter left on said paws enters said litter baffle through the plurality of sieve holes, thereby falling back to said inner frame.

20. The method according to claim 19, wherein when filth is needed, said inner frame is allowed to slide back and forth in said outer frame to screen clean cat litter into said outer frame, and the filth remains on said inner frame; and
    after the filth is treated, a head of said inner frame is inserted obliquely downward into said outer frame, and said inner frame is placed under cat litter until bottom surfaces of said inner frame and said outer frame are attached to each other.

* * * * *